S. GELARIE, H. MILKEWITZ AND L. GELARIE.
CEMENTING MACHINE.
APPLICATION FILED FEB. 6, 1919.
1,318,661.
Patented Oct. 14, 1919.
4 SHEETS—SHEET 1.
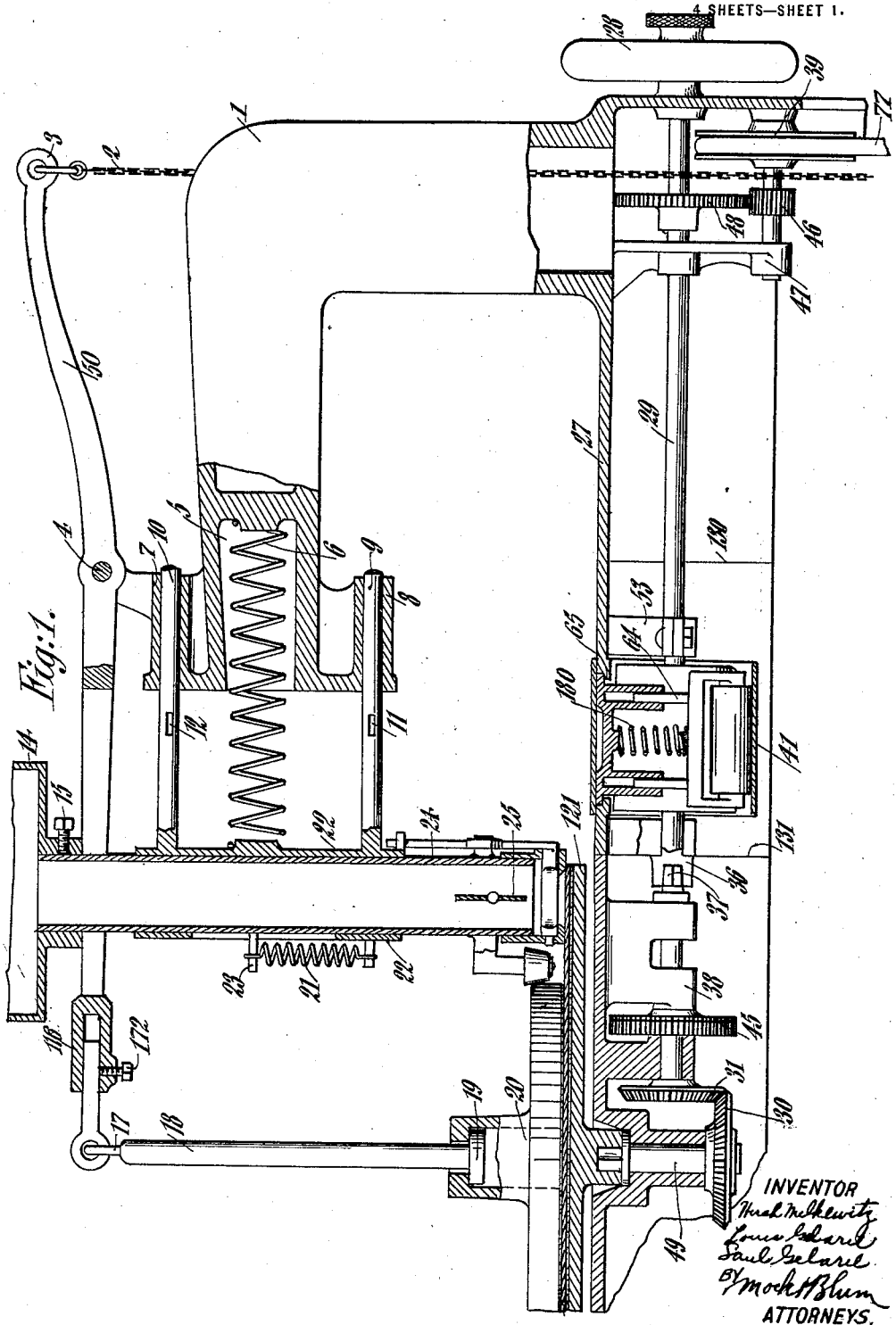

S. GELARIE, H. MILKEWITZ AND L. GELARIE.
CEMENTING MACHINE.
APPLICATION FILED FEB. 6, 1919.
1,318,661.
Patented Oct. 14, 1919.
4 SHEETS—SHEET 2.
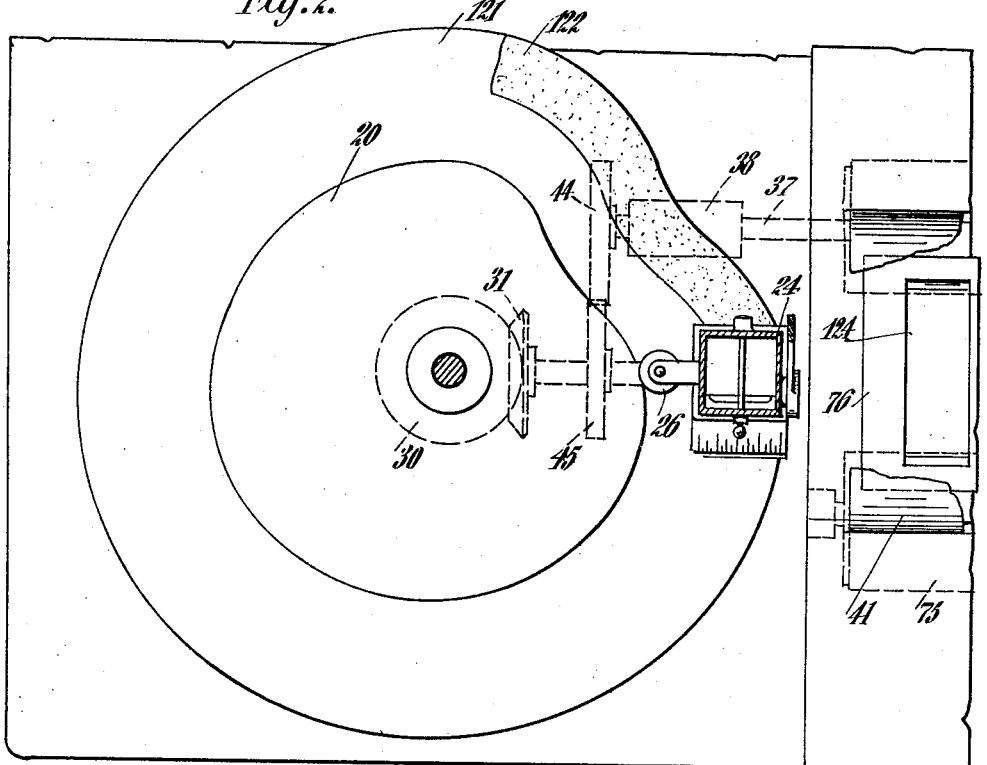
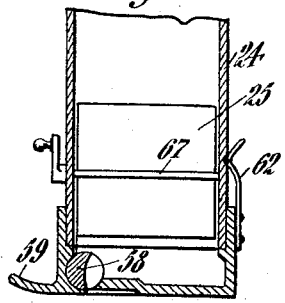
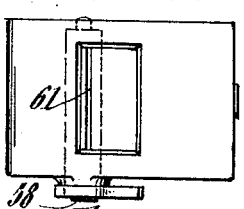
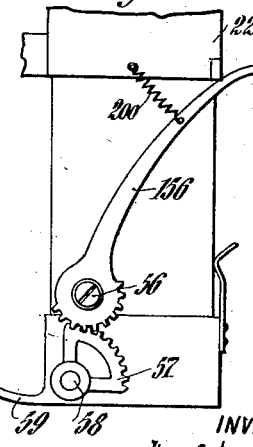
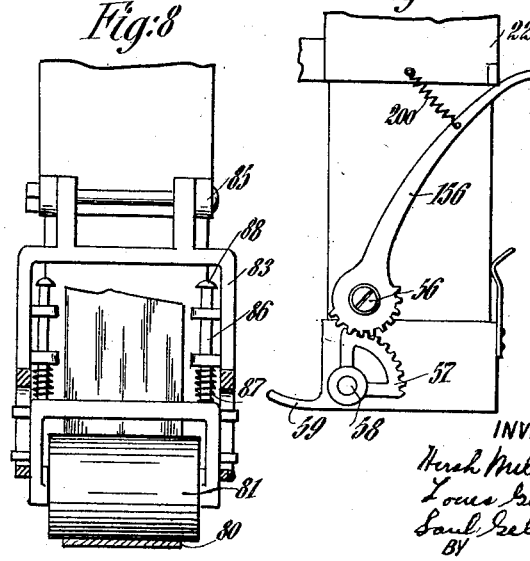
INVENTOR
Hirsh Milkewitz
Louis Gelarie
Saul Gelarie
BY
ATTORNEYS.

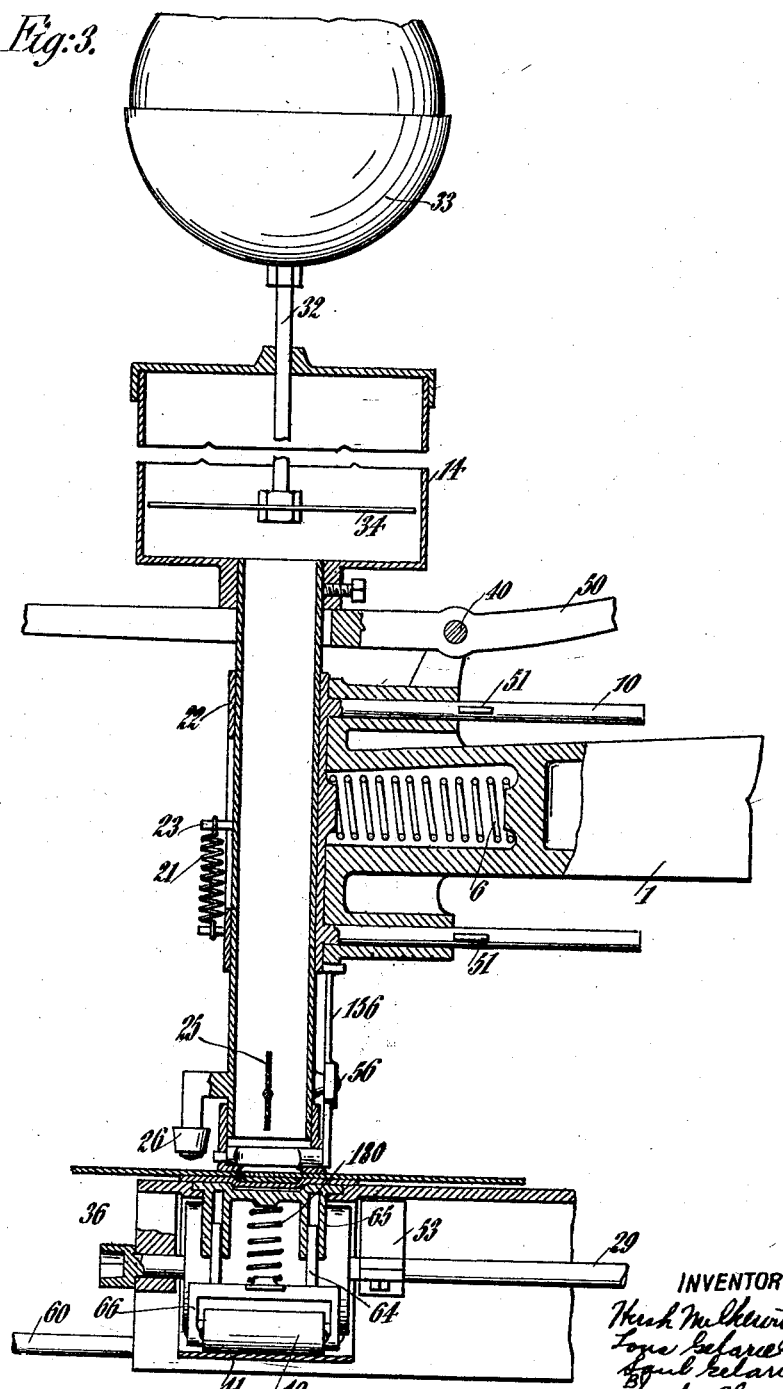

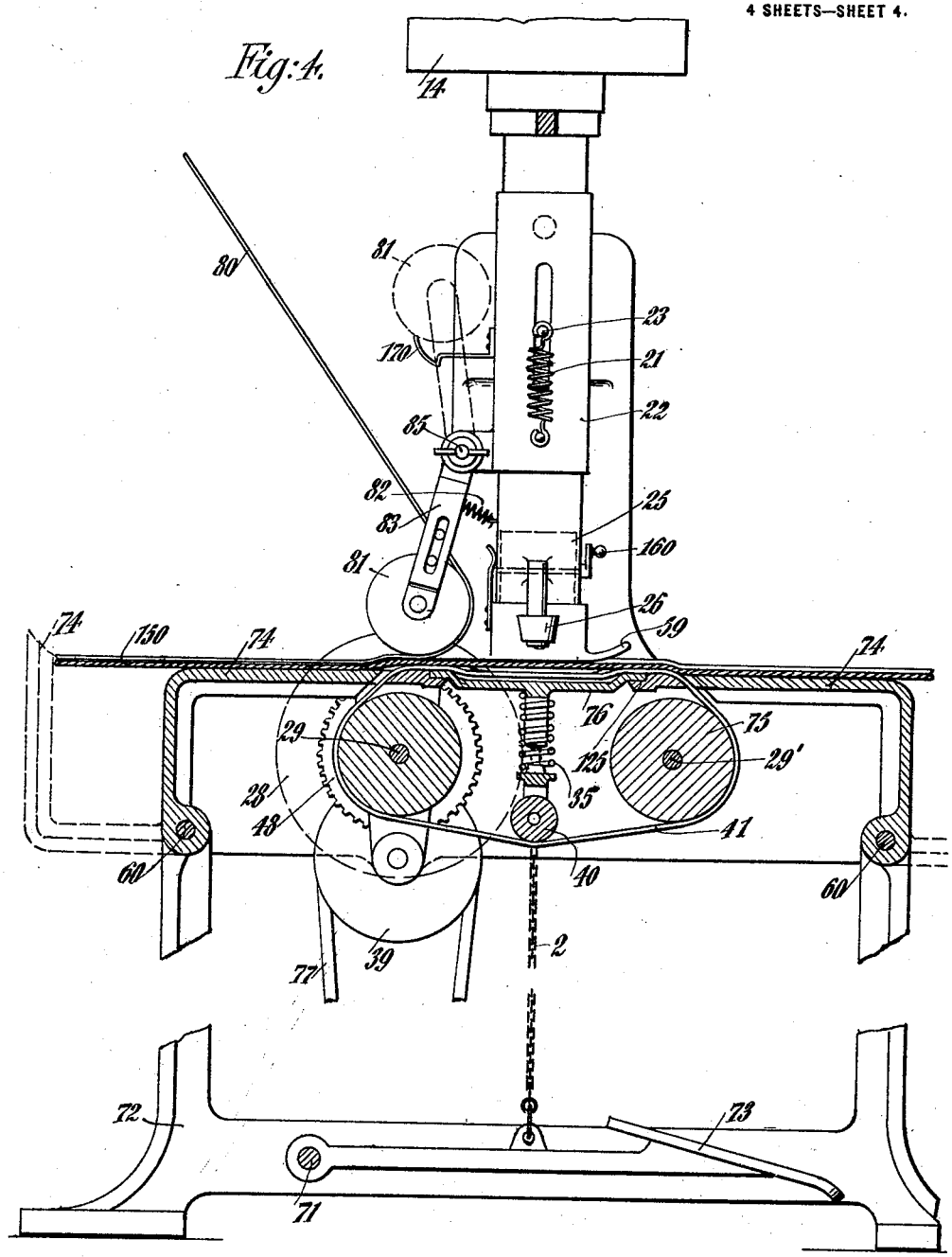

UNITED STATES PATENT OFFICE.

SAUL GELARIE, HIRSH MILKEWITZ, AND LOUIS GELARIE, OF NEW YORK, N. Y.

CEMENTING-MACHINE.

1,318,661.     Specification of Letters Patent.     Patented Oct. 14, 1919.

Application filed February 6, 1919. Serial No. 275,388.

*To all whom it may concern:*

Be it known that we, SAUL GELARIE, a citizen of the United States, HIRSH MILKEWITZ, a citizen of Russia, and LOUIS GELARIE, a citizen of the United States, residing at New York, in the county of New York and State of New York, have invented certain new and useful Improvements in Cementing-Machines, of which the following is a specification.

Our invention relates to a machine for applying cement to rubber garments, gas masks and other articles made of rubber, for cementing tape or the like to said objects, and for also cementing the seams of said objects together.

As is well known may classes of rubber garments and other articles made of rubber have their seams or parts connected by cement. A great demand has therefore sprung up for a machine which would efficiently apply cement to such articles and also cement the parts together, and this is especially the case with gas masks. Up to the present, however, a simple and reliable machine has not appeared on the market and this work is done by hand, which consumes a great deal of time and is very expensive, especially in the manufacture of gas masks and like articles which must be turned out in enormous quantities.

According to our invention a simple, reliable and compact machine is provided which enables a single operator to apply cement, etc., either in a semi-automatic or in an absolutely automatic manner. This machine can be operated with the ordinary small motor used for running sewing machines or the like and is so compact that it can be mounted upon the frame of an ordinary standard-sized sewing machine.

According to our invention the cement can be applied automatically to gas masks and other objects of an irregular outline.

Another object of our invention is to enable the cementing together of endless articles, such as the cuffs of rubber garments. Another object of our invention is to apply cement to seams or the like where one side of a garment is higher than the other, in a reliable manner.

Other objects of our invention will be disclosed in the following description and drawings which illustrate a preferred embodiment thereof.

A similar embodiment of our invention is shown in our copending application No. 275,387, of even date herewith.

Figure 1 is an elevation of our machine partially in section.

Fig. 2 is a plan view partially in section.

Fig. 3 is a detail view similar to Fig. 1.

Fig. 4 is an elevation partially in section taken at right angles to the planer of Fig. 1.

Fig. 5 is a vertical central section through the lower end of the cement chute.

Fig. 6 is a plan view of Fig. 5.

Fig. 7 is an elevation of the lower end of the cement chute illustrating the closing mechanism.

Fig. 8 is an elevation of the roller for applying tape to the garment or other object operated upon.

The entire machine is preferably mounted upon a frame 72, similar to the frame of a sewing-machine and having a table 27. The entire machine is operated by a pulley 39 which is actuated by a belt 77 that is driven by any suitable source of power, which is not shown in the drawings as this in itself is old and well known and as such forms no part of our invention.

The belt 77 is preferably driven by an ordinary sewing machine motor of the well known light type. The pulley is mounted on a shaft runing in the bearings 47 and carrying the spur gear 46 meshing with the spur gear 48 which is mounted on the shaft 29 and is supported by the bearings 47 and 53. The shaft 29 also has a wheel 28 by means of which the operator can quickly stop the operation of the machine. Any familiar brake of any well known type may also be applied to the wheel 28. The shaft 29 terminates in the enlarged head 36 having a square socket into which the shaft 37, which has a correspondingly shaped head, can fit. A pulley 75 is mounted on the shaft 29 and is connected by means of an endless belt 41 with another pulley 75 which is mounted on the shaft 29' that is suitably secured to the frame of the machine.

As is shown especially in Figs. 2 and 4 the belt 41 runs over a bridge 76 having a groove or depression 124. The bridge 76 is detachably mounted on the shoulders 125 of the angular pieces 74 which are pivoted upon the rods 60, as shown in Fig. 4, and may be swung away from the pulleys 75, as shown in dotted lines on the left hand side of Fig. 4. When the angular pieces 74 are in position they extend between the lines 130 and 131 shown in Fig. 1, and have the same level as the work table 27.

At the base of the machine an arm having a foot-rest 73 is pivoted at 71. This arm is connected to a chain 2 that passes through the angular arm 1 and is connected to the eye 3 of the lever 50 which is pivoted at 4. The lever 50 bears against the lower end of a cement receptacle 14, which is connected to the cement chute 24 by means of a set screw 15, or some other convenient and detachable fastening means.

When the foot-rest 73 is forced down, the cement receptacle 14 and the cement chute 24 are moved upwardly as clearly appears in Fig. 1. The cement chute 24 slides up and down in an outer tube 22, which is connected to the horizontal rods 9 and 10 that slide in ways 7 and 8 of the angular arm 1. The tube 22 is urged away from the angular arm 1 by the powerful spiral spring 6. Hence, as shown in Fig. 1, the cement chute 24 can be forced away from the belt 31 to a position over the lower pattern 121, or as shown in Fig. 3, it can be maintained in a position directly over the belt 41 which passes over the pulley 75 being kept in that position by keys or wedges 51, which pass through the apertures 11 and 12 of the horizontal guide pins 9 and 10.

When it is desired to merely apply cement to straight seams, the cement chute 24 is used in combination with the endless belt 41 and in the position shown in Fig. 3. On the other hand when it is desired to apply cement to objects of irregular outlines, such as gas masks or the like, the cement chute 24 is allowed to assume the position shown in Fig. 1. The cement chute 24 is normally kept in its lower position, by the spring 21 which is connected to the tube 22, and detachably secured to the pin 23 which is fastened to the cement chute 24. This spring 21 always tends to urge the chute 24 downwardly, and is overcome by the foot of the operator working through the connections before mentioned.

At its lower end the cement chute 24 is provided with a butterfly valve 25, operated by means of a handle 160.

As shown particularly in Figs. 5, 6 and 7, the lower part of the cement chute 24 is provided with a bottom having a toe 59, which is secured by means of a spring 62 having a bent projection fitting into a notch in the side of the cement chute 24. This detachable bottom of the cement chute 24 is provided with a mutilated shaft 58 operated by means of a toothed segment 57 and the lever 156 pivoted at 56 and also having a toothed segment. When the shaft 58 is turned so that its arcuate portion is over the orifice or slit 61, then the bottom of the cement chute 24 is closed. But when the arcuate portion of the shaft 58 is turned away from the slit 61, this is open and permits cement to pass out. A series of these detachable bottoms with slits or orifices 61 of varying sizes may be provided for each cement chute 24.

When the cement chute 24 is in its operative or lower position, the orifice 61 is open, but when the chain 2 is pulled down by the foot of the operator and the chute 24 is lifted with respect to the outer tube 22 then, as is shown in Fig. 7, the lever 156 impinges on the tube 22 and is rotated, whereby the shaft 58 is simultaneously rotated to prevent any more cement from escaping from the chute, and dripping over the fabric.

To operate with straight seams, our machine is used as follows: The cement chute 24 is locked in its right-hand position, as shown in Fig. 3. The cement receptacle 14 is filled with cement, and the cover bearing the stem 32 and the plunger or piston 34 is then applied, as shown in Fig. 3. The stem 32 has an enlargement 33 into which a series of small weights can be placed, depending upon the speed of operation desired, and the cement is slowly forced out of the receptacle 14 into the cement chute 24. As long as the operator forces down the foot-rest 73 and hence pulls down the chain 2, the cement chute 24 is maintained in its upper and inoperative position, no cement being allowed to escape. The article on which cement is to be applied in a straight line is laid over the belt 41, which is actuated by means of that pulley 75, which is mounted on the shaft 29. As a result the article is moved forward by the belt 41, passes under the toe 59 and a line of cement of uniform width is applied thereto in a reliable manner by means of the cement chute 24. If at any time it is desired to interrupt the operation of the device, the operator merely presses down the foot-rest 73 and instantly stops the application of the cement. If it is desired to stop the movement of the endless belt 41, the machine is disconnected from the source of power which moves the belt 77. In this manner a series of articles can have cement applied thereto by simply pushing down the foot-rest 73 when enough cement has been applied to one article.

If it is desired to apply cement to endless objects, such as the cuffs of raincoats, or the like, then the parts 74 are swung around the rod 60 and the object is laterally slipped over the endless belt 41.

If it is desired to apply cement to the adjacent overlapping edges of two objects, then experience has shown that there is danger that the cement will only be applied to the upper of these edges. The endless belt 41, therefore, runs over the detachable bridge 76, which is provided with a groove or depression 124. The fabric 150 to which the cement is to be applied is forced into this groove or depression, but is not run under the cement chute 24 in a perfectly flat condition but tends to assume an angular configuration, so that both of the overlapping edges catch the cement in an equal and reliable manner. Experience has shown that a sort of trough or hollow is formed in the fabric directly underneath the cement chute so that the cement is properly applied upon the lower piece of fabric. This is because the two overlapped edges tend to remain above the level of the bridge 76 and they are therefore forced downwardly by the cement chute into the depression. The tension of the belt is preferably made so great that the weight of the cement chute cannot force it against the bottom of the depression 124.

A series of bridges 76 having grooves or depressions 124 of different widths can be supplied with each machine.

In order to cement pieces of fabric together, tape 80 is led from a reel placed in any convenient location and not shown in the drawings, over a roller 81. This roller 81 has yoke 83 pivoted at 85 and is preferably made of soft rubber or faced with that material. It slides on the yoke 83 and is always downwardly forced by means of the springs 87. It is guided up and down by means of the pins 86 having the heads 88 which prevent the roller from being forced too far down.

The yoke 81 is preferably connected to a detachable secured spring 82, which forces it downwardly against the fabric 150. If, however, it is desired to merely apply cement, then the roller 81 is swung to inoperative position and is kept there by means of the spring 170 shown in Fig. 4.

By means of the parts already described, cement can be applied to all kinds of straight seams; it can also be uniformly and properly applied to the overlapping edges of two pieces of fabric; these overlapping edges can be permanently secured by means of suitable tape. A very important object of my invention, however, is to apply cement in an automatic manner to objects having an irregular outline, such as the parts of gas masks.

For this purpose the counter-shaft 31 is provided at the left of the line 131, shown in Fig. 1, and this counter-shaft 37 may be drawn into and out of mesh with the shaft 29. The shaft 37 is mounted in the bearing 36 and as shown in Fig. 2 has a spur gear 44 which meshes with a gear 45 mounted on a shaft carrying the bevel gear 31, which meshes with the bevel gear 30. This bevel gear 30 actuates a short vertical shaft 49 upon which a pattern 121 is mounted. The lever 50 is provided with an extension 116 into which a short link is adjustably secured by a set screw 172. This link is connected by means of the eye 17 to a vertical rod 18 having a head 19 whereby the upper pattern 20, which is quite heavy, can be raised or allowed to rest on the lower pattern 121. The upper pattern 20 is shaped like a cam and has any desired contour, dependent upon the shape of the object to which the cement has been applied. The spring 6 forces the outer tube 22 to the left, until the wheel 26 contacts with the cam surface of the pattern 20. When this is done the orifice through which the cement issues is exactly over the edge of the lower pattern 121, so that the line of cement 122 is applied to any object which is held clamped between the two patterns 20 and 121.

The operation of this part of our machine is as follows: The upper pattern 20 is lifted and the object to which the cement is to be applied is placed upon the lower pattern 121. Then the upper pattern 20 is lowered until it rests upon the lower pattern 121 and clamps the object to be cemented by reason of its weight. The keys 51 are then removed, and the spring 6 urges the cement chute 24 to the left, until the wheel 26 contacts with the cam surface of the upper pattern 20. As the machine now rotates, cement is uniformly and reliably applied to the entire periphery of the irregular object. When this has been done, the cement chute 24 is raised thereby cutting off the supply of cement. A new object is put on the pattern 121 and the machine is again operated as before.

By means of this machine, cement can be applied to any sort of seam, either straight or of any irregular contour, pieces of fabric can be fastened together, and generally speaking anything can be done either in a semi-automatic or an entirely automatic manner that is now done by hand. The frictional hold of upper pattern 20 on the fabric and on the lower pattern is sufficient to keep it in place during the cementing operation.

We have shown a preferred embodiment of our invention with a large number of details, but it is obvious that these can be changed and omitted and numerous alterations made without departing from the spirit of our invention.

The belt 41 is maintained taut by the roller 40 guided in its up and down movement by the pin 64 sliding in the guides 65, and downwardly forced by the spring 180. It is preferable to maintain the belt 41 so tight that the cement chute 24 does not force the belt 41 against the adjacent surface of the depression of the bridge 76. A spring 200 is provided, shown in Fig. 7, to always tend to close the valve means 58.

The portion of the work table to the left of the line 131, together with all the parts connected thereto, can be slid to the left on the rods 60, whenever desired, especially when the machine is being used on straight seams.

We claim:—

1. In a machine for cementing garments, a rotatable support, means for holding an object to which cement is to be applied on the said support, a cement chute, means for moving said cement chute to and fro, and means for guiding the said cement chute in a definite path around the periphery of said object as the said support is rotated, whereby cement is deposited from the said cement chute on the said object in a predetermined line following said periphery.

2. In a machine for cementing garments, a rotatable support, means for rotating the said support, means for holding an object on the said support, a cement chute having its bottom at substantially the same level as the top of the support, the said cement chute being capable of a horizontal reciprocating movement, means for constantly urging said cement chute in one direction, a wheel connected to the said cement chute, and a cam coöperating with the said wheel to cause the said cement chute to reciprocate in a predetermined manner during the rotation of the said support so that it always remains adjacent the periphery of said object, whereby the cement is deposited in the said cement chute in a predetermined path.

3. In combination, an outer tube, means for guiding said outer tube in a horizontal reciprocating path, means for urging said outer tube in one direction, a cement chute mounted in the said outer tube and capable of a vertical movement with respect thereto, means for lowering the said cement chute to an operative position and for raising it to an inoperative position, valve means for controlling the flow of cement from said chute, automatic means for closing the said valve means when the chute is raised to its inoperative position and for permitting the opening of the said valve means when the chute is lowered to its operative position, a rotatable support for carrying an object to which cement is to be applied, clamping means adapted to rest on the said support and hold an object thereon, said clamping means having a cam surface, the said chute having a wheel connected thereto and adapted to be guided by the said cam surface, the said support and the said clamp being rotated in unison whereby the cement is delivered on the said object along a predetermined line.

4. In combination, a machine having a rotatable support, means for rotating the said support, an outer tube located above the said support, guide means for guiding said outer tube in a horizontal reciprocating path, means for urging the said outer tube in one direction, a cement chute carried within the said outer tube, valve means for controlling the flow of cement from the said cement chute, a clamp adapted to rest on the said support and hold an object thereon and rotate therewith, a link connected to the said clamp and adapted to raise and lower it, means for simultaneously raising and lowering said cement chute and the said clamp, and automatic means for closing the said valve means when the said chute is raised and for permitting the opening of the said valve means when the said chute is lowered, the said clamp having a cam surface adapted to guide the said chute and determine its position, as the said support and clamp are simultaneously rotated.

In testimony whereof we hereunto affix our signatures.

SAUL GELARIE.
HIRSH MILKEWITZ.
LOUIS GELARIE.

Copies of this patent may be obtained for five cents each, by addressing the "Commissioner of Patents, Washington, D. C."